United States Patent
Lauwers

(10) Patent No.: US 8,512,020 B2
(45) Date of Patent: Aug. 20, 2013

(54) LINING ELEMENT COMPRISING A SHELL AND A CORE

(75) Inventor: Olivier Lauwers, Yronde et Buron (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/140,769

(22) PCT Filed: Dec. 16, 2009

(86) PCT No.: PCT/FR2009/052569
§ 371 (c)(1),
(2), (4) Date: Sep. 6, 2011

(87) PCT Pub. No.: WO2010/076503
PCT Pub. Date: Jul. 8, 2010

(65) Prior Publication Data
US 2011/0309556 A1    Dec. 22, 2011

(30) Foreign Application Priority Data
Dec. 17, 2008 (FR) ..................... 08 58706

(51) Int. Cl.
*B29C 33/38* (2006.01)

(52) U.S. Cl.
USPC ............ 425/28.1; 254/219; 254/497; 425/46; 425/470

(58) Field of Classification Search
USPC .................. 425/28.1, 35, 46, 470; 264/219, 264/497
See application file for complete search history.

(56) References Cited

U.S. PATENT DOCUMENTS

| | | | |
|---|---|---|---|
| 2,736,924 A | | 3/1956 | Bean |
| 4,553,918 A | * | 11/1985 | Yoda et al. .................. 425/46 |
| 4,576,559 A | | 3/1986 | Yoda et al. |
| 4,708,609 A | * | 11/1987 | Yoda et al. ................. 425/28.1 |
| 4,992,035 A | * | 2/1991 | Holroyd et al. .............. 425/46 |
| 5,340,294 A | | 8/1994 | Kata |
| 5,866,171 A | | 2/1999 | Kata |
| 5,985,204 A | * | 11/1999 | Otsuka et al. ............. 264/497 |
| 7,384,252 B2 | * | 6/2008 | Iwamoto et al. ............ 425/46 |
| 2001/0048182 A1 | | 12/2001 | Caretta et al. |

FOREIGN PATENT DOCUMENTS

| | | |
|---|---|---|
| DE | 199 29 333 C1 | 12/2000 |
| DE | 10 2004 028 462 A1 | 12/2005 |
| EP | 0 523 958 A1 | 1/1993 |
| EP | 0 818 290 A2 | 1/1998 |
| EP | 0 868 955 A1 | 10/1998 |
| EP | 1 652 644 A1 | 5/2006 |

OTHER PUBLICATIONS

International Search Report mailed May 11, 2010 for International Application No. PCT/FR2009/052569.
Search Report dated Aug. 26, 2009 for French Application No. 0858706.

* cited by examiner

*Primary Examiner* — James Mackey
(74) *Attorney, Agent, or Firm* — Buchanan Ingersoll & Rooney PC

(57) ABSTRACT

The invention concerns a lining element intended to be applied to a support block of a segment of a segmented mold for tires, the lining element being intended to form tread patterns on part of a tire tread, characterized in that it comprises an outer shell (30) delimiting an inner volume and a core (34) inside the shell.

8 Claims, 2 Drawing Sheets

LINING ELEMENT COMPRISING A SHELL AND A CORE

BACKGROUND

1. Field

The invention relates to the field of tire vulcanization moulds, and more particularly moulds of the segmented type.

2. Description of Related Art

A segmented mould comprises a number of separate parts which are brought together to delimit a quasi-toroidal mould cavity. In particular, a segmented mould has two lateral shells for molding the sidewalls of the tire, and a plurality of peripheral segments located between the shells for molding the tire tread. All these parts are brought together in an appropriate sequence of operations provided by a chosen mechanism. The green tire must be firmly applied and retained against the mould in order to produce a precise architecture and geometric dimensions and form the patterns of the tread.

In order to form the patterns of the tread, the segments of the mould comprise elements projecting from the radially inner surfaces of the segments, these elements forming a negative of the patterns to be molded on the tire tread.

To enable a single mould to be used to manufacture tires having tread patterns of different shapes, there is a known method, described for example in EP 0 523 958, for making a segment of the mould in a plurality of elements, namely a support block having a general shape defining the general curvature of the tire tread, and a plurality of lining elements applied to the support block and designed to form the patterns of the tire tread.

The lining element described in that document is produced by molding, for example by molding in steel. It is therefore a bulky, heavy element which is expensive to manufacture.

SUMMARY

The object of the invention is, notably, to provide a more economical lining element.

For this purpose, the invention proposes a lining element intended to be applied to a support block of a segment of a segmented mould for tires, the lining element being intended to form patterns on part of a tire tread, characterized in that it comprises an outer shell delimiting an inner volume and a core inside the shell for withstanding the mechanical forces which act on the shell during the molding of the tire, the shell and core being made in one piece by laser sintering, and in that the core comprises a network of partitions. Since only the outer surface of a lining element participates in the molding of the patterns of the tire tread, the inner structure of the lining element can be different from the outer structure of the element. The invention therefore proposes the design of a lining element which is not solid, as in the prior art, but comprises a shell and a core.

Thus it is possible to choose different structures for the manufacture of the shell and the core, given that these two parts of the lining element have to meet different requirements: it is important for the shell to be relatively smooth to ensure that the surface state of the tread patterns is correct, whereas the core must be sufficiently strong to withstand the mechanical stresses arising from the molding of the tire.

The specific structure of the lining element according to the invention thus enables the core to be adapted to the stresses to which it is subjected. Thus, the use of the network of partitions makes it possible to produce a core having sufficient structural strength to withstand the mechanical stresses arising from the molding of the tire. The strength of the core is adapted to these stresses, making it possible to manufacture an assembly having uniquely necessary and sufficient characteristics in respect of its strength. Thus the strength of the core of the assembly according to the invention is not excessive, and because of this the manufacture of the assembly is facilitated and simplified.

The shell and the core are made in one piece, meaning that the shell and core are made from one material, or in other words are made from the same material, by laser sintering in this case.

The element is made by selective laser melting, more commonly known as laser sintering. The objects are produced by the selective melting of powders and are constructed by the superposition of layers. The name of this sintering method is also abbreviated to SLM (selective laser melting). The advantage of this method of manufacturing parts is that the shape of the part can be modeled by computer and the part can easily be produced by sintering based on this modeling. The laser can be controlled by a computer which contains a model of the part, and the part can then be manufactured by the sequential sintering of superposed layers of powder. This method is particularly suitable for the manufacture of a mould liner, because it can be used to manufacture small lining elements such as strips or bands.

By carrying out this laser sintering operation sequentially on layers of material superposed on each other, the lining element can be manufactured in the desired shape. In order to form an area which is on the surface of any given layer, the laser must scan the whole surface, which requires a certain amount of time. However, if the purpose of the sintering is to form an area which is quasi-linear in any given layer, such as a vertical partition, the powder must be scanned with the laser along the length of the linear element which is to be manufactured. Clearly, therefore, the forming of a surface element by laser sintering requires more time than the forming of a linear element.

The shape and arrangement of the partitions can be variable. For example, the network of partitions is shaped in predetermined arrangements of shapes in two dimensions such as honeycomb, rhombic, triangular or square shapes, which may be straight or curved, or in three dimensions such as cubic, pyramidal or diamond shapes or others. As mentioned above, it is quicker to form a network of partitions by laser scanning along linear curves or small structures than it is to form a solid material by laser scanning on solid surfaces. Alternatively, the structure of the core can also be formed by using a network of supporting bars interconnected to form a structural assembly. Thus, when a lining element is to be manufactured by laser sintering, it is particularly useful if this liner comprises a shell and a core, as this offers a considerable saving of time by comparison with a solid lining element.

According to other, optional, characteristics of the invention:

- The shell is made from a solid material. This ensures that the shell has the necessary rigidity and surface state for the correct molding of the tread patterns of the tire.
- The shell has a thickness in the range from 0.25 to 2 millimeters.
- The skin is shaped in such a way that the inner volume which it delimits is sealed. In this case it becomes impossible to remove the powder remaining between the partitions of the core. This has the advantage of improving the thermal conductivity of the mould element. This configuration also makes it possible to form a core which has no partition and in which the compacted powder present inside the sealed volume of the shell is in itself capable of imparting the necessary and sufficient mechanical rigidity to the shell.

The partitions of the core have a thickness in the range from 0.05 to 1 millimeter.

The core is formed by a network of interconnected supporting bars.

The invention also proposes a method of manufacturing an element as defined above, in which sequential laser sintering is carried out on layers of material superposed in a given direction.

The material used in this method can be, for example, a metal powder.

BRIEF DESCRIPTION OF DRAWINGS

The invention will be more clearly understood from the following description which is provided solely by way of example and which refers to the drawings, in which.

DETAILED DESCRIPTION OF SPECIFIC EMBODIMENTS

Figure 1:
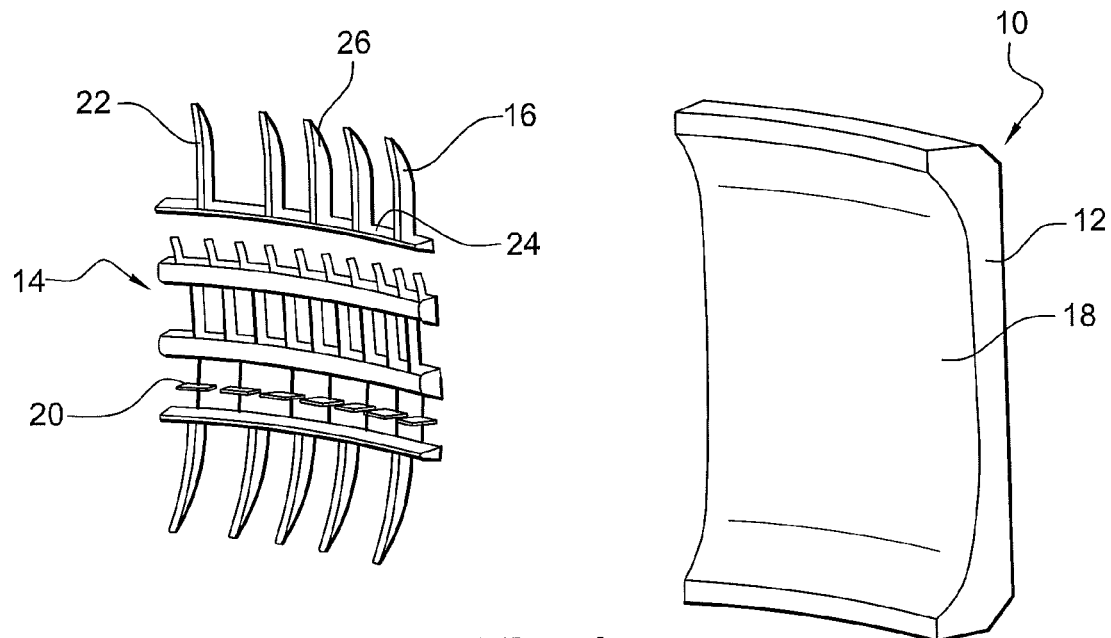
FIG. 1 is an exploded perspective view of a segment of a tire vulcanization mould, the segment having a plurality of lining elements according to the invention.
Figure 2:
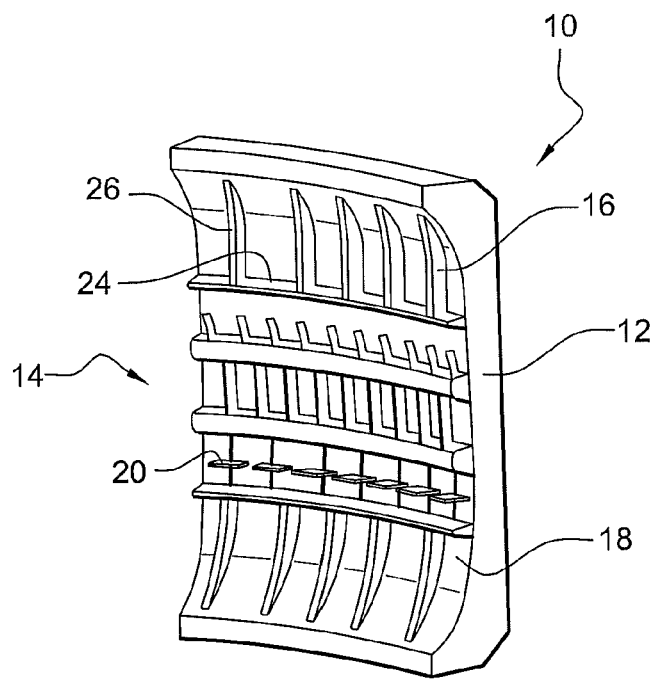
FIG. 2 is a view identical to that of FIG. 1, showing one segment.

FIGS. 1 and 2 show a segment 10 of a segmented mould for the vulcanization of a tire. The segmented mould (not shown) comprises a plurality of segments distributed circumferentially in the form of a cylinder so as to define the general shape of the tread of the tire to be vulcanized.

In FIG. 1, the different elements making up the segment 10 are shown in exploded form, while in FIG. 2 the segment is shown with all the elements of the segment 10 assembled together.

The segment 10 comprises a support block 12 and a set 14 of lining elements 16 intended to form the patterns of part of the tread of the tire to be molded.

The set 14 of lining elements 16 is intended to be applied to a radially inner surface 18 of the segment 12, as shown in FIG. 2.

The set 14 is composed of different types of lining elements 16: for example, the set 14 can comprise strips 20 oriented substantially circumferentially with respect to the tire and intended to form grooves arranged on the surface of the tread, or combs 22 each having a band 24 oriented circumferentially and a set of blades 26 oriented axially with respect to the tire. The blades 26 are intended to form grooves on the edges of the tire tread.

Figure 3:
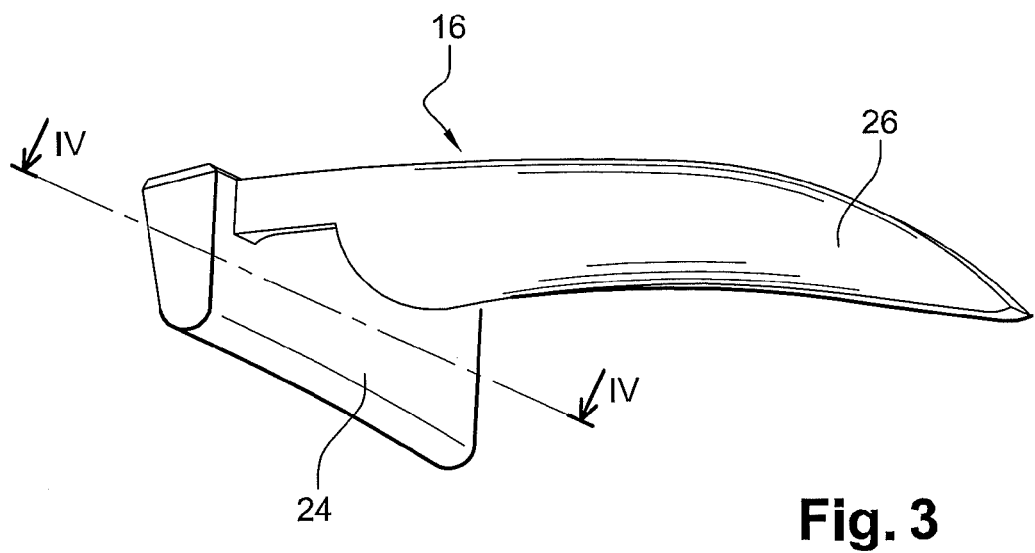
FIG. 3 is a detailed perspective view of a lining element of the segment of FIG. 1.

A detail of the comb 22 is shown in FIG. 3.

Figure 4:
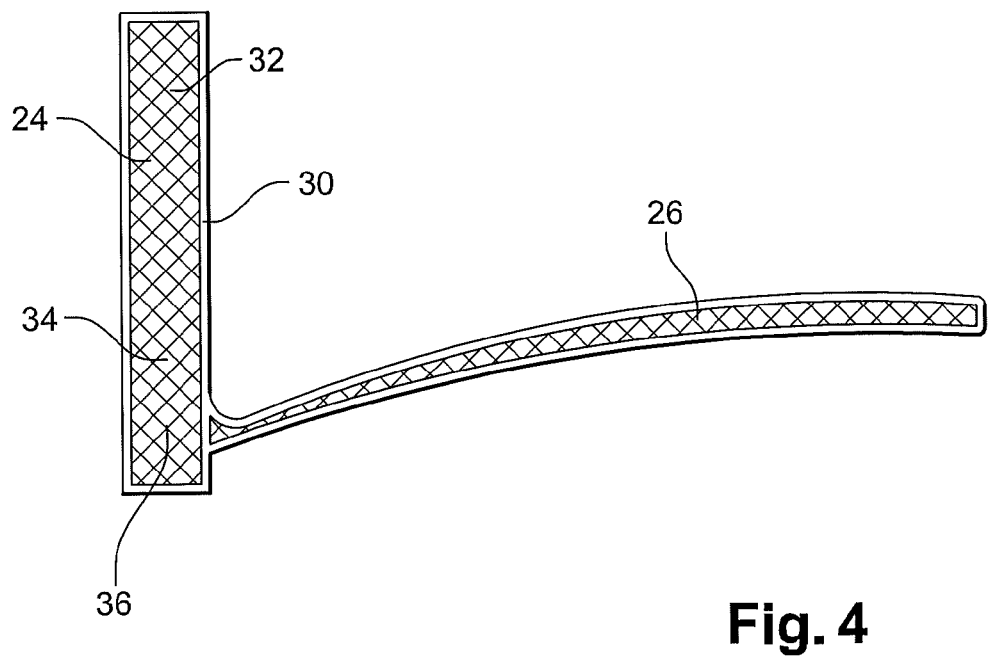
FIG. 4 is a sectional view of the element shown in FIG. 3.

FIG. 4 is a sectional view of the assembly of the band 24 and the blade 26 shown in FIG. 3.

It can be seen that the lining element 16 shown in FIG. 3 has an outer shell 30 delimiting an inner volume 32, and an inner core 34 occupying the inner volume 32.

The outer shell 30 is made from solid material, while the inner core 34 comprises a network of partitions 36 arranged to form squares.

Empty spaces are left between the partitions 36 of the network forming the core.

Thus the inside of the shell mainly comprises empty spaces separated by the partitions 36 of the core 34. The lining elements 16 of the segment 10 are made by a method of selective laser sintering of layers of metal powder, in such a way that the shell 30 and the core 34 of a lining element 16 are made in one piece.

In the production of this lining element, the time required for the laser sintering of a wall increases with the thickness of the wall. This is because the surface area of the metal powder layer to be scanned with the laser increases with the thickness of the wall.

Clearly, therefore, the manufacture of the core 34 in the form of a network of partitions is faster than if the core were solid.

The thickness of the shell 30 can vary, for example, between 0.25 and 2 millimeters, which will ensure that its outer appearance is relatively smooth in order to form a tire pattern of the tread which is smooth and clean. The thickness of the partitions 36 of the core 34 can vary from 0.05 to 1 millimeter. This is because the core 34 is intended to provide overall rigidity of the element 16, and consequently there is no need for its surface state to be perfect.

Additionally, it should be noted that it is particularly advantageous to form the network of partitions of the core by laser sintering, because this process leaves metal powder in the interstices of the network. The presence of this metal powder can increase the thermal conductivity in the element 16, thus improving the thermal behavior of the lining elements in the vulcanization of the tire.

The invention claimed is:

1. A lining element intended to be applied to a support block of a segment of a segmented mould for tires, the lining element being intended to form patterns on part of a tire tread, comprising an outer shell delimiting an inner volume and a core inside the shell for withstanding mechanical forces acting on the shell when the tire is molded, the shell and the core being made in one piece by laser sintering, and wherein the core comprises a network of partitions.

2. The lining element according to claim 1, wherein the shell has a thickness in the range from 0.25 to 2 millimeters.

3. The lining element according to claim 1, wherein the shell is shaped in such a way that the inner volume which it delimits is sealed.

4. The lining element according to claim 1, wherein the network of partitions is shaped in the form of a honeycomb, rhombus, triangles or squares.

5. The lining element according to claim 1, wherein the partitions have a thickness in the range from 0.05 to 1 millimeter.

6. The lining element according to claim 1, wherein the network of partitions of the core is formed by a network of interconnected supporting bars.

7. The lining element according to claim 1, wherein a space between the partitions of the core is occupied by metal powder.

8. A method of manufacturing an element according to claim 1, comprising sequential laser sintering of layers of material superposed in a given direction.

* * * * *